United States Patent [19]

Heinemann et al.

[11] 4,350,244

[45] Sep. 21, 1982

[54] PUSH GRID

[75] Inventors: Otto Heinemann, Ennigerloh; Heinz-Herbert Schmits, Rheda-Wiedenbruck; Rainer Philipp, Ahlen; Artur Berger, Beckum, all of Fed. Rep. of Germany

[73] Assignee: Krupp Polysius AG, Fed. Rep. of Germany

[21] Appl. No.: 158,479

[22] Filed: Jun. 11, 1980

[30] Foreign Application Priority Data

Jul. 26, 1979 [DE] Fed. Rep. of Germany ....... 2930406

[51] Int. Cl.$^3$ .......... B65G 25/00

[52] U.S. Cl. .......... 198/773; 110/328; 110/281

[58] Field of Search .......... 198/773-775, 198/750; 110/281, 289-291, 328; 34/164; 165/92, 116, 120

[56] References Cited

U.S. PATENT DOCUMENTS 2,431,799 12/1947 Gaffney .......... 110/328

4,200,047 4/1980 Knorr .......... 110/281

*Primary Examiner*—Robert B. Reeves

*Assistant Examiner*—Brian Bond

*Attorney, Agent, or Firm*—George M. Thomas

[57] ABSTRACT

The invention relates to a push grid comprising grid panels which overlap one another and which are alternately fixed and reciprocable longitudinally of the push grid; grid panel supports provided with a slot-like opening for holding the grid panels; tie members which project through the slot-like opening in the grid panel supports and which, at one end, engage in the associated grid panel; and spring elements arranged between the other end of the tie members and a web of the grid panel supports accommodating the slot-like opening for biassing the connection between the grid panels and the grid panel supports.

In order to obtain reliable fixing of the grid panels to the grid panel support, for example even in the event of an excessive increase in length of the tie members or in the event of breakage of the spring elements, the web (7) with the slot-like opening (6) is arranged inclined relative to the horizontal and the suspension point (14) of the tie member (4) on the grid panel (1) is situated at a greater distance from the lower than from the upper end of the slot-like opening (6) (FIG. 2).

8 Claims, 3 Drawing Figures

PUSH GRID

This invention relates to a push grid comprising grid panels which overlap one another and which are alternately fixed and reciprocable longitudinally of the push grid; grid panel supports provided with a slot-like opening for holding the grid panels; tie members which project through the slot-like opening in the grid panel supports and which, at one end, engage in the associated grid panel; and spring elements arranged between the other end of the tie members and a web of the grid panel supports accommodating the slot-like opening for biassing the connection between the grid panels and the grid panel supports.

Push grids are used for receiving and conveying various loose materials which may be treated in various ways. For example, cool material may be treated with hot treatment gases or hot material may even be treated with cool treatment gases.

With push grids of the type in question, it is important to keep wear, the evolution of heat and the energy consumed in the movement of the push grid as low as possible. For this reason, particular attention is paid to the fixing of the grid panels to the grid panel supports, steps having to be taken to ensure that, although dismantlable and replaceable, the grid panels are connected sufficiently firmly to the grid panel support. In addition, provision has to be made for individual grid panels to be replaced without the adjacent grid panels having to be dismantled.

In one known push grid construction of the type mentioned at the beginning (cf. DE-AS No. 24 32 599), there is provided on the underneath of the grid panel support only one horizontally extending short web with an open slot in which engages the lower end of a tie bolt of which the opposite end engages through a wedge with inclined contact surfaces on the grid panel support on the one hand and on the underneath of the grid panel on the other hand. Springs provided on the tie bolts are intended to ensure better bracing. However, if in this known construction the tie bolts become longer under the effect of heat (for example through hot material), the originally firm connection between the grid panel and the grid panel support is partly or completely broken (depending on the intensity of the heat effect), something which not even the springs provided can compensate because these springs soften at high temperatures and hence lose their compensating effect. The tie bolt also ceases to perform its bracing function in the event of breakage of the above-mentioned springs so that a firm connection of the corresponding grid panel is again no longer guaranteed. In either case, the result is an increase in wear or destruction of the grid panel and hence an adverse effect on the work of the push grid.

Accordingly, the object of the invention is to provide a push grid of the type mentioned at the beginning which always guarantees reliable fixing of the grid panels to the associated grid panel support, particularly in the event of excessive increases in length or in the event of breakage of the spring elements.

According to the invention, this object is achieved in that the web with the slot-like opening is arranged inclined relative to the horizontal and the point at which the tie member is engaged in the grid panel is situated at a greater distance from the lower end than from the upper end of the slot-like opening.

If, in this embodiment of the grid panel fixing according to the invention, the tie member of a grid panel should increase in length through excessive heat effect, this change in length may certainly be compensated by the associated spring element in the first instance. However, in the event of a significant change in length, the tie member is able to pivot under its own weight about the point of engagement on the grid panel so that, by virtue of the inclination of the web, the point of application of the other end of the tie member (with the spring element) shifts along the slot-like opening in such a way that the tie member again ensures fixing of the grid panel. Reliable automatic holding is obtained in this way and becomes effective even when the spring element of a tie member should break. This automatic holding effect is always guaranteed by virtue of the fact that the point at which the tie member engages in the grid panel is situated at a greater distance from the lower end than from the upper end of the slot-like opening so that, in other words, in its initial fixing position the tie member extends inclined in relation to a vertical plane extending through the point of engagement in the grid panel and hence always guarantees the self-holding effect by its own weight.

Further particulars will become apparent from the subsidiary claims and from the following description of two examples of embodiment illustrated in the accompanying drawings, wherein:

Figure 1:
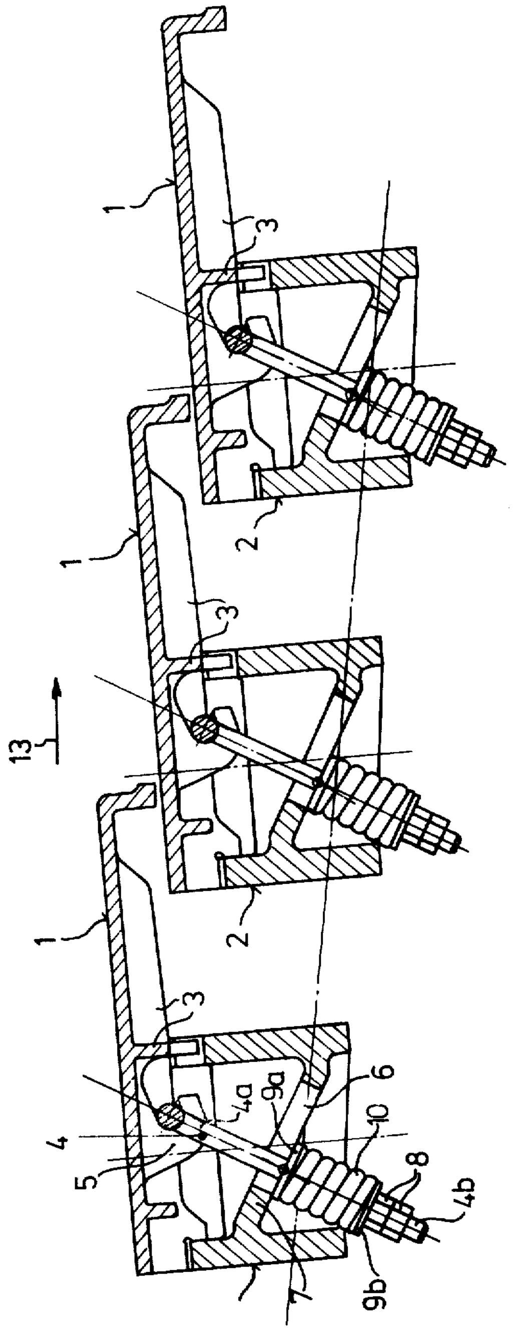
FIG. 1 is a partial cross-section through a first embodiment of the push grid according to the invention.

In the interests of simplicity, FIG. 1 shows only part of the push grid according to the invention in a partial cross-sectional view in which the parts essential to the invention can be seen. The push grid comprises in the usual way several (in this case three) grid panels 1 which overlap one another like scales and which are each fixed to a grid panel support 2, the arrangement being such that several such grid panels 1 lie one behind the other in a row transversely of the push grid (perpendicularly of the plane of the drawing) and may be fixed to the corresponding grid panel support 2. In the usual way, the grid panels 1 are alternately fixed and reciprocable longitudinally of the grid, which may be effected by means of the grid panel support 2. In addition, the individual grid panels 1 may be supported on the associated grid panel supports 2 in the usual way via ribs 3 or the like.

The fixing of the grid panels 1 to the associated grid panel support 2 is crucial. To this end, a tie member formed in the present embodiment by a tie bolt 4 is provided for each grid panel 1. The upper end **4*a* of the tie bolt 4 is suspended in a hook 5 projecting downwards from the underneath of the grid panel 1 and projects through a slot-like opening 6 which is formed in a web 7 of the grid panel support 2. A compression spring 10 is arranged between the other end 4*b* of the tie bolt 4 and the web 7 with locknuts 8 and washers 9*a* and 9*b* in between, its function being to brace the connection between the particular grid panel 1 and the associated grid panel support 2**.

Figure 2:
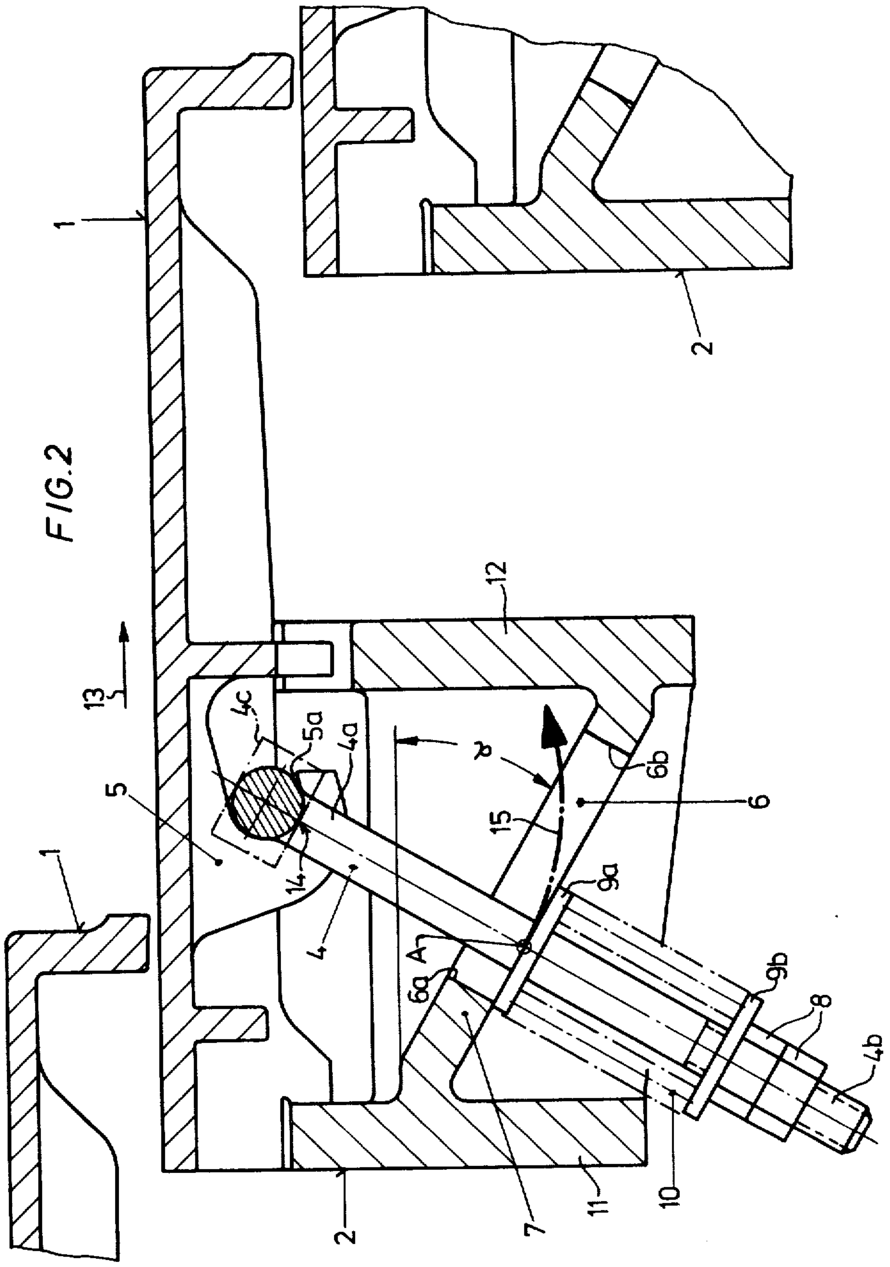
FIG. 2 shows part of the push grid illustrated in FIG. 1 on a larger scale to demonstrate the fixing of a grid panel by means of a rectilinearly inclined web.

However, the configuration and arrangement of the web 7 on the grid panel support 2 are important in this fixing setup. As can be seen in particular from FIG. 2, the grid panel support 2 shown in cross-section has two, in this case substantially vertically extending stays 11, 12 arranged at an interval from and parallel to one another, whilst the web 7 containing the slot-like opening 6 is arranged inclined relative to the horizontal and, as seen in the cross-sectional view in FIG. 2, is integrally connected at its ends on the one hand to the stay 11 and on the other hand to the stay 12. In the embodiment illustrated, the web 7 is inclined downwards in the direction in which the material is conveyed (arrow 13). This inclination is at an angle $\alpha$ of from about 5° to 45° and preferably from 20° to 30° relative to the horizontal. The slot-like opening 6 also extends in the direction of this sloping web and is in the form of a closed slot which is just wide enough to allow the tie bolt 4 to be pushed through.

In order where the grid panels are fixed in this way simultaneously to provide for a self-holding fixing setup, the arrangement of the web 7 and in particular the position of the slot 6 are selected in such a way that the suspension point 14 of the tie bolt 4 on the grid panel 1 is situated at a greater distance from the lower end 6*b* than from the upper end 6*a* of the slot 6.

If, therefore, a grid panel 1 of the push grid is refixed to the grid panel support 2, the tie bolt 4 with its point of application A on the web 7 will be situated near the upper end 6*b* of the slot (as shown for example in FIG. 2). If then the tie bolt 4 undergoes an excessive increase in length through thermal expansion, the tie bolt 4 depending obliquely relative to the vertical will move from its position shown in FIG. 2 to the right in the direction of the arrow 15 under its own weight until its point of application A is back in engagement with the web 7 so that the fixing of the grid panel 1 is automatically held intact. During this movement, the tie bolt 4 makes a pivoting movement in the engagement or suspension position 14 (in the direction of the arrow 15). This automatic hold cannot be spontaneously released even by vigorous movements of the grid panel 1 both in the vertical and in the horizontal direction. On the contrary, it is made even stronger by shaking, vibration, etc. It can only be loosened or released by loosening the locknuts 8 on the end 4*b* of the tie bolt.

The downwardly projecting hook 5 provided on the underneath of the grid panel 1 may be formed in any suitable manner and adapted to the upper suspension end 4*a* of the tie bolt 4. For example, it would be possible to provide a simple suspension hook in which the similarly hook-shaped or eye-shaped suspension end of the tie bolt engages.

In one preferred embodiment, however, the hook 5 is in the form of a double hook with two parallel hook portions arranged at an interval from one another (lying behind one another perpendicularly of the plane of the drawing in FIG. 2) whilst the tie bolt has a T-form, as has been indicated in FIG. 2 by a transversely extending end piece 4*c*' denoted by a dash-dot line. On the one hand, this tie bolt 4 lies between the two hook portions at its suspension end 4*a*, on the other hand the transversely extending end piece 4*a*' engages in the two hook portions of the hook 5 so that this end piece 4*c*' lies on the suspension point 14 of the hook 5.

In these configurations of the hook 5, however, it is always important to ensure that the hook 5 is open in the direction of the inclination of the web, i.e. in the direction of the arrow 13, and that the free end 5*a* of the hook 5 is somewhat higher than the lowest suspension surface of the hook for the suspension end 4*a* of the tie bolt, this suspension surface being essentially determined by the suspension point 14.

It is quite clear from the foregoing description that, to replace a grid panel 1, the associated tie bolt 4 merely has to be adequately loosened, after which it may be disengaged from the hook 5 of the grid panel 1 and may remain suspended from the slot 6 of the web 7 until the old grid panel has been removed and replaced by a new grid panel which is then fixed to the grid panel support 2 in the reverse order by means of the tie bolt 4.

Figure 3:
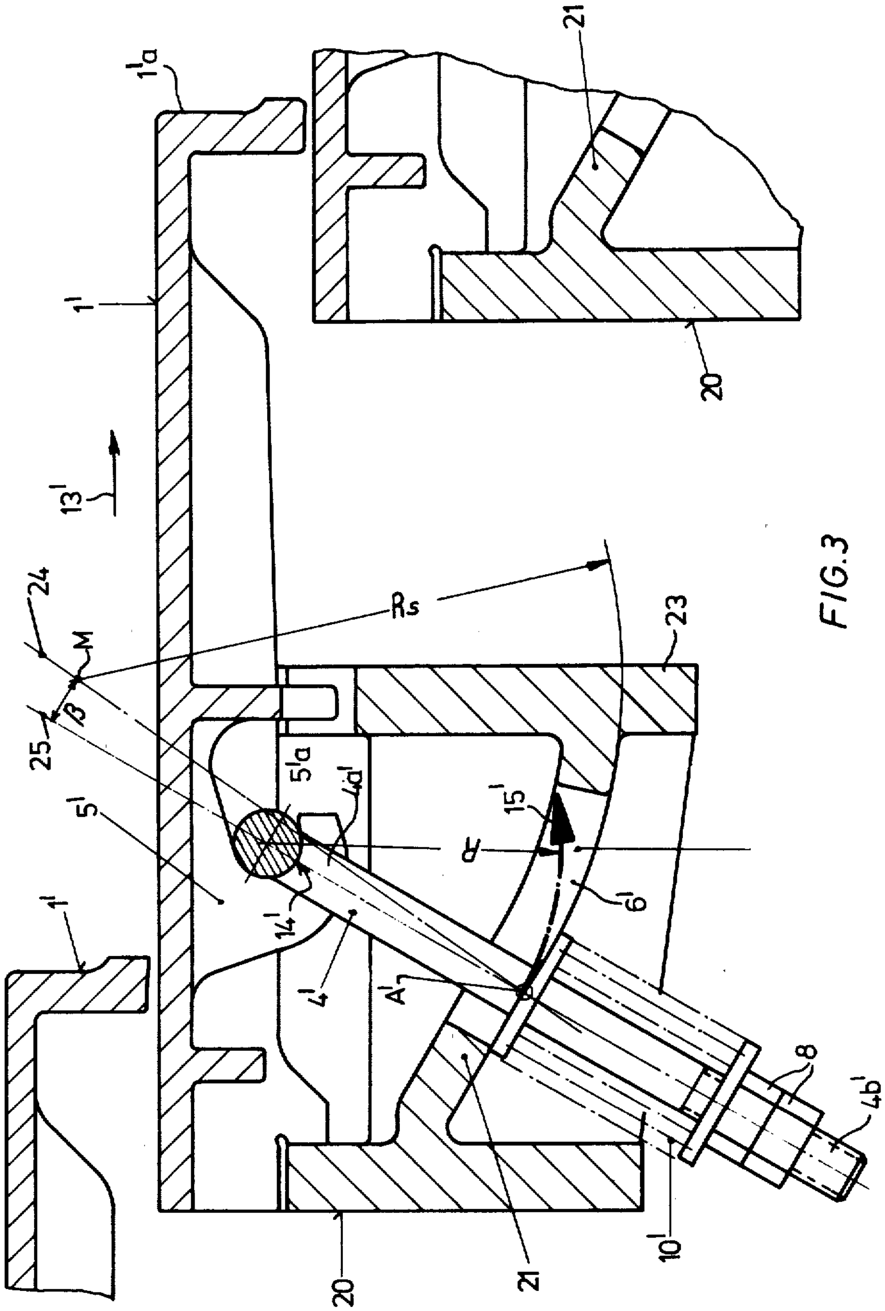
FIG. 3 is a cross-sectional view similar to FIG. 2 illustrating the fixing of a grid panel by means of an inclined web terminating in a curve.

A second embodiment of the fixing setup for the grid panels as shown in FIG. 3. In this embodiment, those elements of the push grid which are identical with their counterparts in the embodiment illustrated in FIGS. 1 and 2 are denoted by the same reference numerals plus an apostrophe in the interests of simplicity.

The main difference between this second embodiment and the first lies in the configuration of each grid panel support 20, but above all in the configuration and arrangement of its web 21. By contrast, the stays 22 and 23 interconnected by the web 21 may be designed and arranged in the same way as the stays 11 and 12 in FIGS. 1 and 2.

Although, in this embodiment (FIG. 3), the web 21 of each grid panel support 20 is again inclined at an angle of from about 5° to 45° and preferably from 20° to 30°, this inclination is not rectilinear, as in the embodiment shown in FIGS. 1 and 2, instead this inclined web 21 terminates in a concave curve relative to the suspension point 14' of the tie bolt 4', as clearly shown in FIG. 3. On its lower outside side, this curve has a radius $R_s$ which may be up to four times as large as the theoretical pendulum radius R of the tie bolt 4, starting out from the point of application A' of the tie bolt 4' on the web 21 in the direction of the suspension point 14'. The centre point M of the curve is preferably situated on a straight line 24 which is inclined at an angle $\beta$ of from 2° to 10°, preferably of the order of 5°, relative to the central axis 25 of the tie bolt, towards the delivery edge 1'*a* of the grid panel or rather in the transport direction of the material (arrow 13'). In the embodiment shown in FIG. 3, the radius of curvature $R_s$ amounts to between about 1.5 and 2 times the value of the theoretical pendulum radius R which—as shown in FIG. 3—substantially represents the distance from the centre of rotation at the suspension end 4*a*' of the tie bolt 4' to the point of application A' of the tie bolt 4' on the web 21.

When, in this second embodiment, the tie bolt 4' pivots in the direction of the arrow 15 (under its own weight) as a result of a corresponding increase in length, particularly sensitive and reliable automatic maintenance of the fixing setup provided here is obtained by virtue of the particular curvature of the web 21, reliable maintenance of the suspension end 4*a*' of the tie bolt in the suspension position 14' of the hooks 5' always being guaranteed at the same time.

As for the rest, the grid panel 1' with its hook 5', the tie bolt 4' with its element (including the spring 10') and the grid panel support 20 may be designed and replaced in the same way as in the first embodiment (FIGS. 1 and 2), as already mentioned.

We claim:

1. A push grid comprising grid panels which overlap one another and which are alternately fixed and reciprocable longitudinally of the push grid; a grid panel support for each grid panel provided with a web defining a slot-like opening; a tie member which projects through the slot-like opening in each grid panel support and which, at one end, engages the associated grid panel; and a spring element arranged between the other end of each tie member and the web of its grid panel support for engaging the web and biasing the grid panel towards its grid panel support, characterised in that the surface of said web situated adjacent said opening and supporting said spring element is inclined relative to the horizontal and is offset to the suspension point of the tie member in the longitudinal direction of the push grid with the upper portion of the web about said opening located closer to the point at which the tie member is suspended from the grid panel than the lower portion of the web about said opening, so that the force of gravity tends to urge the tie member along the opening until the spring element engages the surface of the web about the opening is situated at a greater distance from the lower end than from the upper end of the slot-like opening.

2. A push grid as claimed in claim 1, characterised in that the inclination of the web (7;21) relative to the horizontal extends at an angle ($\alpha$) of from about 5° to 45°, preferably from 20° to 30°, the slot-like opening (6; 6') extending in the direction of this inclination and being formed by a closed slot.

3. A push grid as claimed in claim 1 or 2, characterised in that the web (7) has a rectilinear inclination.

4. A push grid as claimed in claim 1 or 2, characterised in that the inclined web (21) terminates in a concave curve relative to the suspension point (14') of the tie member (4').

5. A push grid as claimed in claim 4, characterised in that the radius of curvature ($R_s$) of the web (21) is up to four times larger, preferably from 1.5 to 2 times larger, than the theoretical pendulum radius (R) of the tie member (4'), starting out from the point of application (A') of the tie member on the web (21) in the direction of the suspension point (14'), the centre point (M) of the curve lying on a straight line (24) which is inclined at an angle ($\beta$) of from 2° to 10° relative to the central axis (25) of the tie member towards the delivery edge **(1'*a*)** of the grid panel.

6. A push grid as claimed in claim 1, characterised in that the suspension end **(4*a*; 4*a*') of the tie member (4;4') is suspended in a downwardly projecting hook (5;5') which is provided on the underneath of the grid panel and which is open in the direction of inclination of the web and of which the free end (5*a*;5'*a*)** is situated somewhat higher than the lowest suspension surface of the hook for the suspension end of the tie member.

7. A push grid as claimed in claim 6, characterised in that the hook (5;5') provided on the underneath of the grid panel in the form of a double hook is formed by two parallel hook portions arranged at an interval from one another and in that the tie member is in the form of a T-shaped tie bolt (4;4') which on the one hand lies between the two hook portions at its suspension end **(4*a*;4'*a*) and which on the other hand engages in the two hook portions with its transversely extending end piece (4*c*)**.

8. A push grid comprising a series of grid panels which overlap one another, a tie member pivotably mounted at one end to each grid panel and suspended downwardly from its grid panel, a grid support positioned below each grid panel and including a web inclined from the horizontal beneath its grid panel, a slot-like opening formed in said web and extending down the incline of said web, said opening extending from its upper end portion at a position offset from beneath the upper end of said tie member downwardly to its lower end portion at a position more directly beneath the upper end of said tie member, said opening being located closer at its upper portion than at its lower end portion to the upper end of said tie member, said tie member extending downwardly through said opening and urged by gravity toward an upright attitude adjacent the lower end portion of said opening, and spring means mounted to said tie member and biased against the lower surface of said web so that the spring means tends to urge the tie member toward the upper end portion of the opening as gravity tends to urge the tie member toward the lower end portion of the opening and the spring means is normally in engagement with the web to bias the grid panel downwardly toward the grid panel support.

* * * * *